(12) United States Patent
Huber et al.

(10) Patent No.: US 7,654,566 B2
(45) Date of Patent: Feb. 2, 2010

(54) GAS GENERATOR UNIT

(75) Inventors: Joachim Huber, Kirchdorf (DE); Ernst Wittmann, Hebertshausen (DE)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 11/948,601

(22) Filed: Nov. 30, 2007

(65) Prior Publication Data
US 2008/0131631 A1 Jun. 5, 2008

Related U.S. Application Data

(63) Continuation of application No. PCT/EP2006/005031, filed on May 26, 2006.

(30) Foreign Application Priority Data

Jun. 3, 2005 (DE) .................. 20 2005 008 847 U

(51) Int. Cl.
B60R 21/26 (2006.01)
(52) U.S. Cl. ....................... 280/736; 280/742
(58) Field of Classification Search ............. 280/727, 280/728.1, 732, 736, 737, 741, 742; 428/34.1
See application file for complete search history.

(56) References Cited

U.S. PATENT DOCUMENTS

| | | | | |
|---|---|---|---|---|
| 4,964,654 | A * | 10/1990 | Bishop et al. | 280/728.2 |
| 5,058,919 | A * | 10/1991 | Paquette et al. | 280/732 |
| 5,857,696 | A * | 1/1999 | Inoue et al. | 280/728.2 |
| 5,951,041 | A * | 9/1999 | Iwai et al. | 280/737 |
| 6,595,547 | B2 * | 7/2003 | Smith | 280/736 |
| 6,890,001 | B1 * | 5/2005 | Smith | 280/736 |
| 7,195,280 | B2 * | 3/2007 | Wheelwright et al. | 280/743.1 |
| 7,427,082 | B2 * | 9/2008 | Schoenhuber | 280/736 |
| 2003/0151241 | A1 * | 8/2003 | Matsuda et al. | 280/736 |
| 2003/0197357 | A1 * | 10/2003 | Heigl et al. | 280/736 |
| 2004/0124619 | A1 * | 7/2004 | Lewis et al. | 280/741 |
| 2006/0170201 | A1 * | 8/2006 | Matsuda et al. | 280/740 |
| 2006/0186653 | A1 * | 8/2006 | Schoenhuber | 280/741 |
| 2007/0063495 | A1 * | 3/2007 | Saito et al. | 280/736 |
| 2008/0111357 | A1 * | 5/2008 | Heninger et al. | 280/740 |

(Continued)

FOREIGN PATENT DOCUMENTS

DE 20 2004 009 002 9/2004

(Continued)

*Primary Examiner*—Paul N Dickson
*Assistant Examiner*—Karen Jane J Amores
(74) *Attorney, Agent, or Firm*—Brinks Hofer Gilson & Lione

(57) ABSTRACT

Described is a gas generator unit comprising of a cylindrical gas generator (10), the lateral surface (10a) of which demonstrates emission holes (12) arranged in a thrust-neutral manner within a ring-shaped area (10b), and a deflector element (20), which is rigidly connected to the gas generator (10) and is made of a heat resistant material and at least surrounds the ring-shaped area (10b) at least partially. To make the gas generator harmless in the event of a fire, the deflector element (20) demonstrates, in an inflow area (20a) opposite the ring-shaped area (10b), borings (22), which are sealed by at least one blocking element (24, 32) made of a meltable or combustible material, the borings being arranged in such a manner that the gas generator unit is thrust-neutral in the absence of the blocking element (24).

7 Claims, 3 Drawing Sheets

U.S. PATENT DOCUMENTS

2008/0131631 A1 * 6/2008 Huber et al. ............... 428/34.1
2008/0238059 A1 * 10/2008 Astrom ..................... 280/741

FOREIGN PATENT DOCUMENTS

| DE | 20 2004 016 975 | 2/2005 |
| EP | 0 800 960 | 10/1987 |
| WO | WO 02/079008 | 10/2002 |
| WO | WO 03/070527 | 8/2003 |
| WO | WO 2005/012096 | 12/2005 |

\* cited by examiner

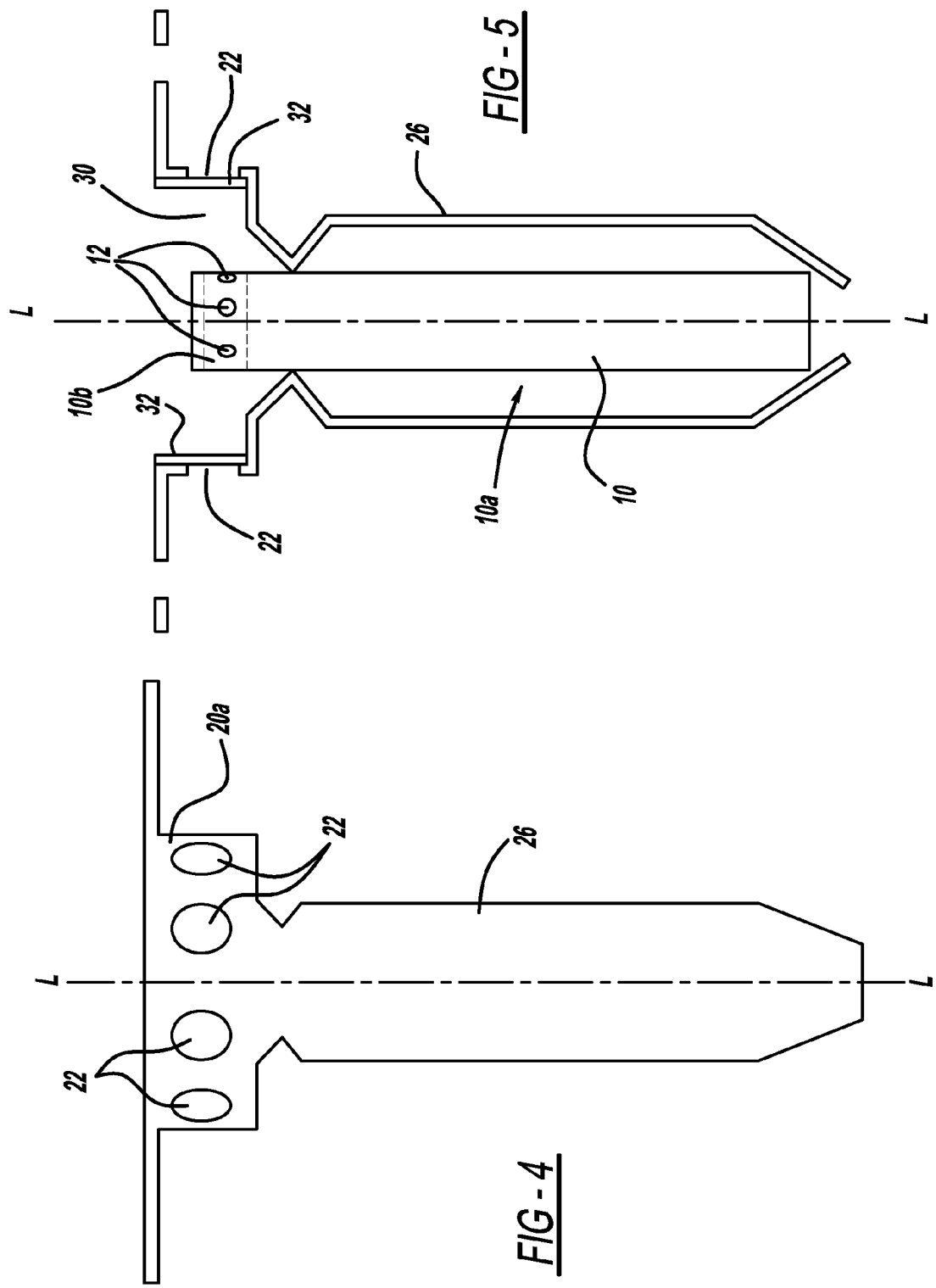

GAS GENERATOR UNIT

CROSS REFERENCE TO RELATED APPLICATIONS

This application claims priority to DE 20 2005 008 847.1, filed Jun. 3, 2005 and PCT/EP2006/005031, filed May 26, 2006.

FIELD OF THE INVENTION

The invention relates to a gas generator unit for an automotive airbag restraint system.

BACKGROUND OF THE INVENTION

Cylindrical gas generators, whose metal surfaces have discharge or emission holes arranged in a thrust-neutral manner within a ring-shaped area, are known for filling airbags. To this end, the ring-shaped area can be relatively small, or can extend over nearly the entire length of the lateral surface. Such an arrangement of emission holes has the advantage that, in case of an unintentional triggering of the gas generators, such as in a warehouse fire, the escaping gas will not accelerate the gas generators like a rocket.

In many applications, it is nevertheless necessary to completely or partially deflect the gas flow issuing from such a gas generator. It is known from WO 02/079008 A1, for example, to arrange a deflector element with a semicircular cross section on the lateral surface of such a gas generator, the deflector element covering half of the emission holes. This serves to protect the surrounding airbag fabric and causes the flow direction of the escaping gas to be oriented radially relative to the longitudinal axis of the gas generator.

DE 20 2004 009 002.3 discloses, among other things, a gas generator unit in which a bushing, which surrounds the cylindrical gas generator and forms a deflector element, deflects the gas flow axially.

The gas generator units, which consist of a gas generator and a deflector element rigidly connected to the gas generator, are frequently prefabricated as a subassembly and possibly placed in intermediate storage. However, these have the disadvantage that there is no thrust-neutrality and the gas generator units represent considerable danger in the event of a warehouse fire.

SUMMARY OF THE INVENTION

It is therefore the objective of the invention to develop a gas generator unit to the effect that it is thrust neutral and harmless in the event of a warehouse fire and won't fly around when gas is expelled from the discharge holes.

The deflector element of the gas generator unit according to the present invention features borings, each of which are sealed by a blocking element made of a meltable or combustible material, located in the inflow area, i.e. the area located opposite the emission holes. To this end, a single blocking element can be provided for all borings or a separate blocking element can be provided for each boring. The thickness and material of these blocking elements are chosen in such a manner that they can withstand the gas escaping from the gas generator for the short time while the gas is escaping under a situation of deploying an associated airbag, but that they will lose their mechanical stability by burning or melting upon further thermal action, substantially more than 100 degrees over several minutes for example. The deflector element itself consists of a heat-resistant material, preferably metal.

Advantageous embodiments of the invention arise from the dependent claims and from the example embodiments, which will now be presented in more detail in reference to the drawing. The drawing shows:

BRIEF DESCRIPTION OF THE DRAWINGS

FIG. 4 shows a second embodiment of the gas generator unit in accordance with this invention in a lateral top view, FIG. 5 shows the gas generator unit from FIG. 4 in longitudinal section.

DETAILED DESCRIPTION OF THE PREFERRED EMBODIMENT

Figure 1:
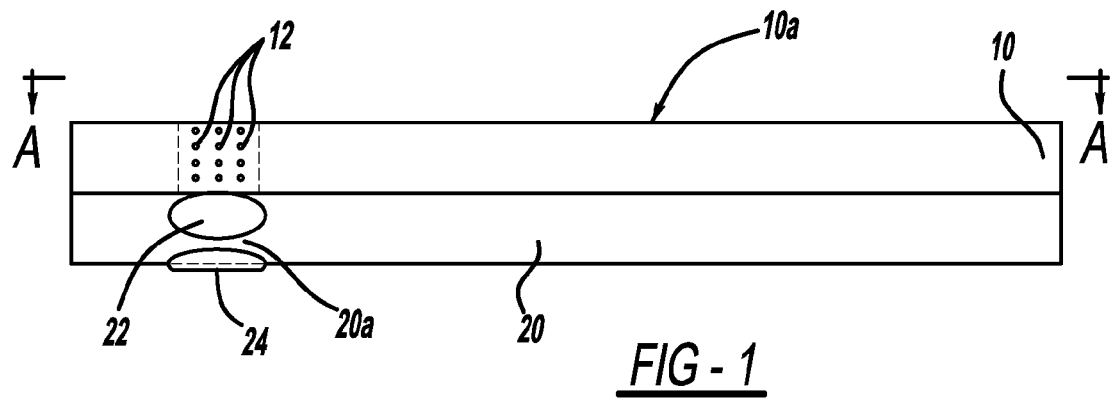
FIG. 1 shows a first embodiment of a gas generator unit in accordance with this invention in a top view from the side.
Figure 2:
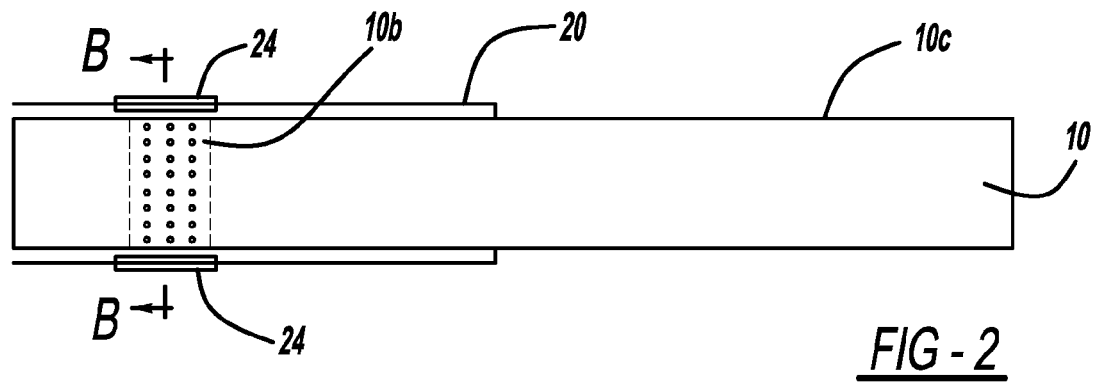
FIG. 2 shows the gas generator unit depicted in FIG. 1 along a top view along the line-of-site A-A from FIG. 1.
Figure 3:
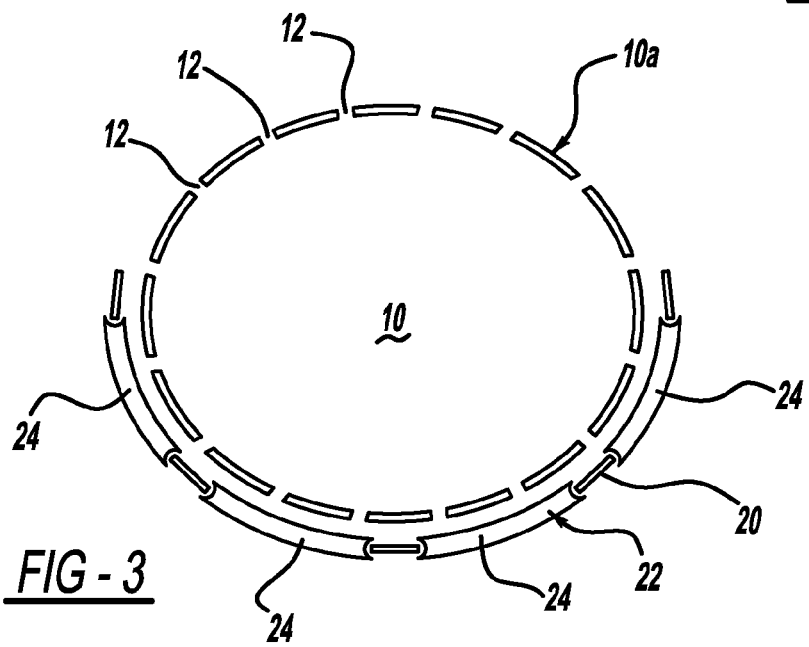
FIG. 3 shows the gas generator unit with a longitudinal section along the plane B-B from FIG. 1.
Figure 6:
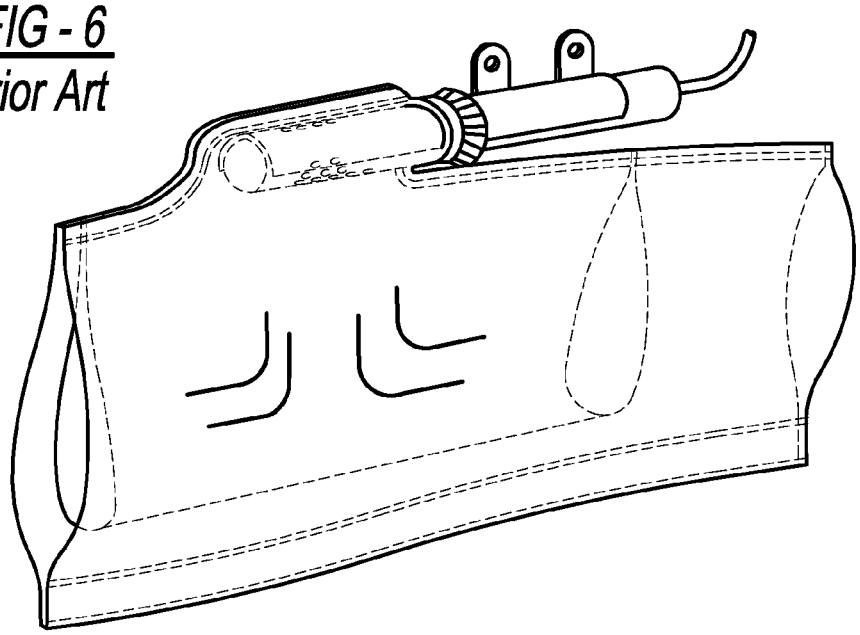
FIG. 6 shows a representation of a prior art inflatable assembly.

FIGS. 1 to 3 depict a first example embodiment of the present invention. The gas generator unit comprises a cylindrical gas generator 10 and a deflector element 20. The gas generator discharge or emission holes 12 are located within a ring-shaped area 10b of the lateral surface 10a of the gas generator 10. The deflector element 20 extends over the entire length of the gas generator 10 and has a semicircular cross section. The deflector element 20 fits into a rear section 10c of the lateral surface 10a of the gas generator 10.

The inflow area 20a of the deflector element 20 is located opposite the ring-shaped area 10b within which the emission holes 12 are located. The gas flow issuing from the gas generator strikes this inflow area 20a directly. Holes or borings 22 are arranged in this inflow area 20a. These borings 22 are relatively large-area and are connected to one another only by relatively thin webs. A blocking element 24, which consists of plastic, is provided in each of these borings 22. The blocking elements 24 can be formed by injecting plastic into the borings 22. To this end, the blocking elements 24 engage the edge of the borings 22 to some extent, so that a positive connection results (only represented schematically in FIG. 3). The material and thickness of the blocking elements 24 must be chosen as a function of the geometry and of the gas generator output in such a manner that the blocking elements remain mechanically stable over the activation period of the gas generator. The material is furthermore chosen in such a manner that it loses its mechanical strength or burns if it is exposed to the heat, over 200° C. for example, for a relatively longer time, i.e. as a rule over several minutes. For this case, a "relatively longer time" is meant to define a time period longer than the activation period of gas generator 10. Many plastics meet these requirements. The deflector element 20 preferably consists of steel sheet.

If the gas generator 20 is actuated, the gas generator unit behaves as depicted in FIG. 1, i.e. the gas is deflected in such a manner that it flows off in a direction directed radially from the gas generator unit. In the event of a fire, however, the borings become open as the blocking elements or method of burn away and therefore the gas flows in all radial directions so that the gas generator unit behaves in a thrust-neutral manner.

Figure 7:
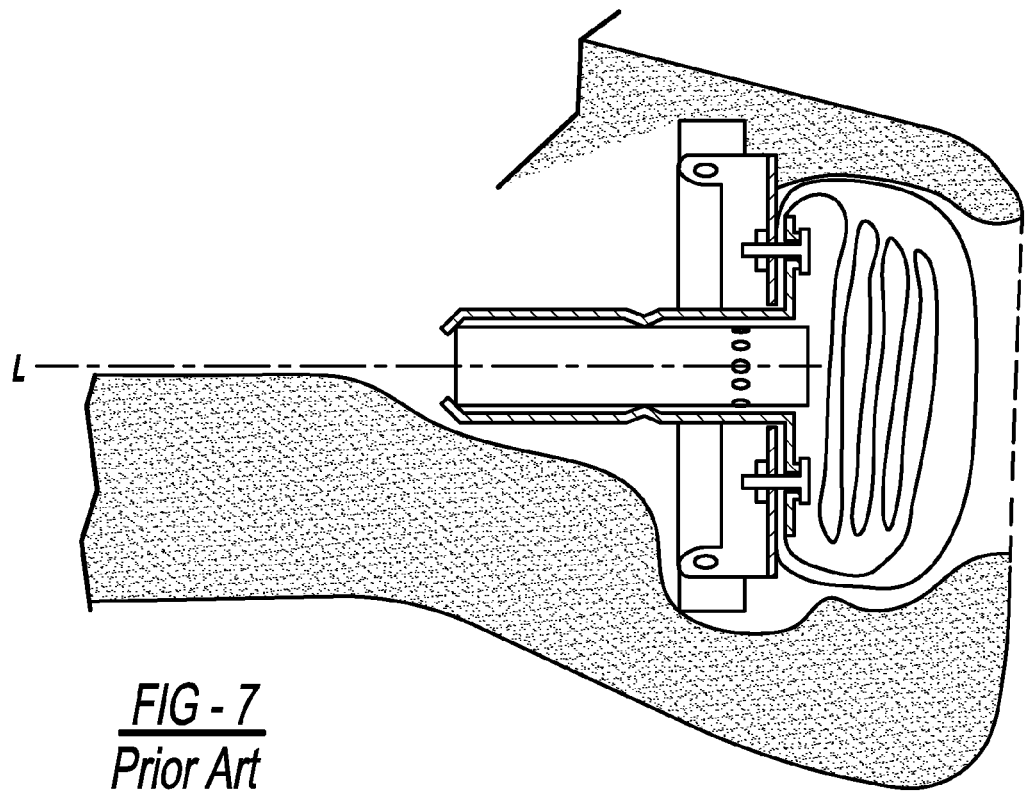
FIG. 7 shows another representation of the prior art.

FIGS. 4 and 5 depict a gas generator unit as it can be used in an arrangement as shown in FIG. 7.

In this case, the bushing 26, which preferably consists of metal, forms the deflector element. In the vicinity of the annular gap 30, which is located between the ring-shaped area 10b of the lateral surface 10a and the bushing 26, the bushing demonstrates borings 22 located essentially opposite the gas discharge holes 12. These borings are covered by the plastic ring 32, which is inserted into the bushing 26 and forms the blocking element in this case. The material and thickness of this plastic ring 32 are chosen in such a manner that it maintains its stability for the time that the gas generator operates during a normal deployment. If a warehouse fire should nevertheless occur, then the plastic ring 32 melts and opens the borings 22, so that a large portion of the gases issuing from the gas discharge holes 12 escapes through these symmetrically arranged borings 22, the gas generator unit thereby behaving in an essentially thrust-neutral manner.

The deflector element 20 is rigidly connected to the gas generator in both example embodiments. In both cases, this is achieved, among other things, in that the deflector element rests on the lateral surface of the gas generator in sections. As a rule, other connecting means, which however are not illustrated here, are provided.

The deflector element 20 preferably consists of metal in both embodiments. Other materials are possible, however, assuming that they are essentially more heat-resistant than the blocking elements.

While the above description constitutes the preferred embodiment of the present invention, it will be appreciated that the invention is susceptible to modification, variation and change without departing from the proper scope and fair meaning of the accompanying claims.

The invention claimed is:

1. A gas generator unit for an airbag restraint system comprising a cylindrical gas generator having a lateral surface which forms a plurality of emission holes arranged in a thrust-neutral manner within a ring-shaped area of the gas generator, and a deflector element, which is rigidly connected to the gas generator and is made of a heat resistant material and at least partially surrounds the ring-shaped area to form an inflow area, the deflector element forms vent holes which are sealed by at least one blocking element made of a meltable or combustible material, the vent holes being arranged in such a manner that the gas generator unit is thrust-neutral upon the melting or combustion of the blocking element, the blocking element maintaining a sealing of the vent holes during a deployment of the gas generator to inflate an associated airbag, wherein the deflector element is a hollow cylinder and that an annular gap is configured between the lateral surface and the deflector element defining the inflow area.

2. A gas generator unit according to claim 1, wherein the deflector element comprises metal.

3. A gas generator unit according to claim 1, wherein the blocking element comprises plastic.

4. A gas generator unit according to claim 1, wherein the blocking element is configured as a one-piece integral construction inserted into the deflector element.

5. A gas generator unit according to claim 1, wherein the deflector element forms the vent holes exclusively in the inflow area.

6. A gas generator unit according to claim 1, wherein the deflector element is connected directly to the lateral surface of the gas generator at least in sections thereof.

7. A gas generator unit according to claim 1, wherein the melting or combustion of the blocking element occurs when the blocking element is exposed to a temperature of 200° C. for a time period more than an activation period of the gas generator for deployment of the associated airbag.

* * * * *